United States Patent Office 2,707,014
Patented Apr. 26, 1955

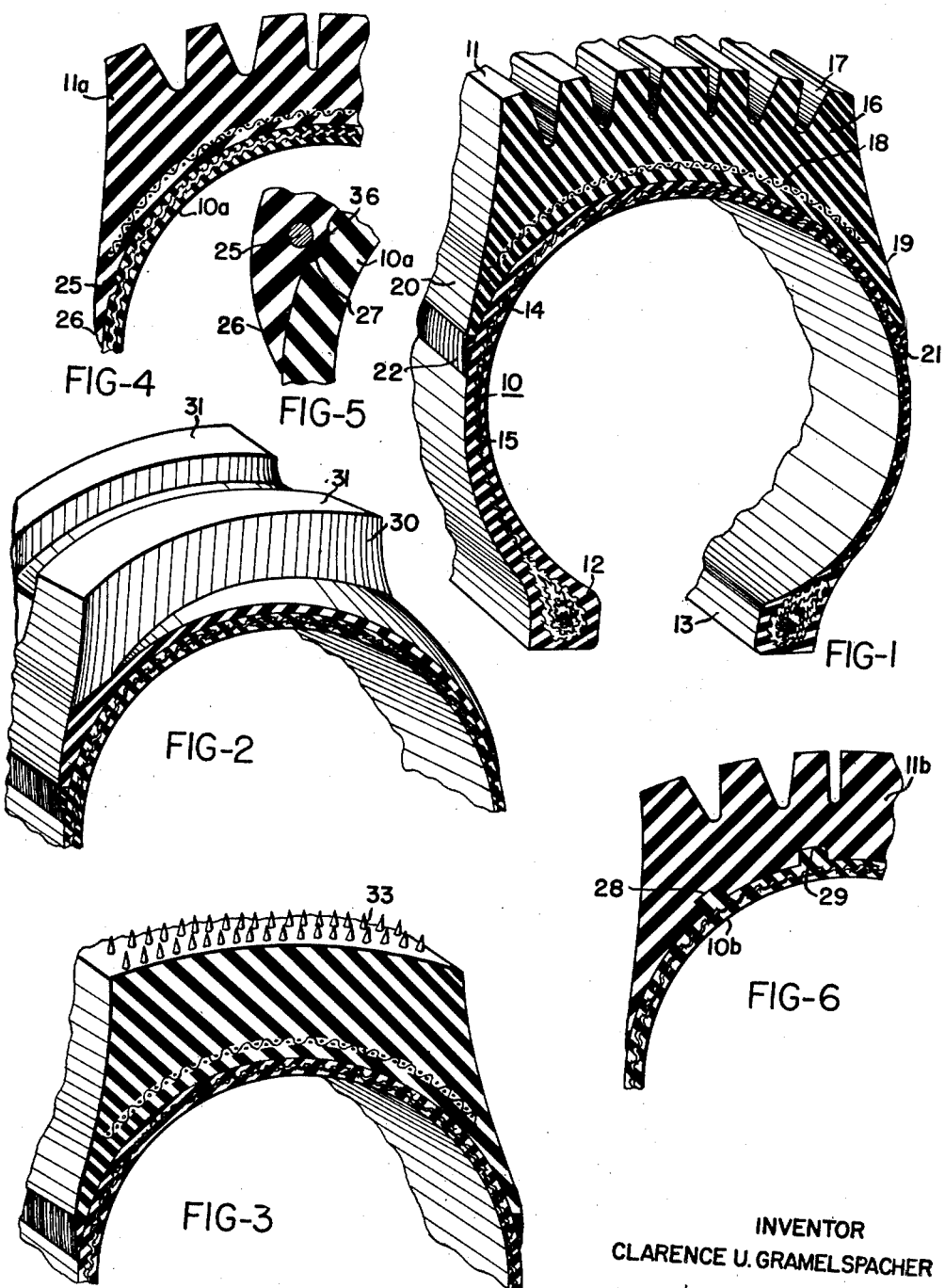

2,707,014

DETACHABLE TREAD TIRE

Clarence U. Gramelspacher, Jasper, Ind.

Application September 26, 1951, Serial No. 248,325

1 Claim. (Cl. 152—175)

This invention relates to automobile tires.

An object of the invention is to provide an automobile tire in which the casing and the tread are separate elements so that the tread can be replaced on the casing and removed therefrom at the will of the owner.

It is also an object of the invention to provide an automobile tire in accordance with the foregoing object whereby in a tire set is provided constituting a plurality of tread designs that can be selectively placed onto a common casing to meet varying road conditions, such as fair weather driving, or mud, snow, and ice conditions.

It is another object of the invention to provide an automobile tire wherein the casing and the tread are separate members with the tread being selectively removable from the casing at the will of the owner, and wherein the expansion of the casing when filled with its normal complement of air secures the tread onto the casing.

It is another object of the invention to provide an automobile tire in accordance with the foregoing object wherein means is provided between the tread and the casing to resist lateral movement of the tread on the casing.

It is another object of the invention to provide an automobile tire in accordance with the foregoing objects wherein a fabric layer is provided in the tread member of the combination tread and casing to resist expansion of the tread relative to the casing.

Further objects and advantages will become apparent from the drawings and the following description.

In the drawings:

Figure 1 is a transverse cross-sectional view of a tire incorporating the subject of this invention.

Figure 2 is a transverse cross-sectional view of a portion of a tire like that of Figure 1 but illustrating a different tread applied to the tire casing, the tread being particularly adapted for mud roads.

Figure 3 is a transverse cross-sectional view of a portion of a tire like that of Figure 1 but illustrating another tread applied to the tire casing, the tread being particularly adapted for use on icy roads.

Figure 4 is a cross-sectional view of a portion of a tire like that of Figure 1 but having a nonextensible annularly arranged wire placed in the tread near the terminous edge thereof.

Figure 5 is an enlarged cross-sectional view illustrating placement of the wire in the tread edge of Figure 4.

Figure 6 is a transverse cross-sectional view of a portion of a tire like that of Figure 1 but of a modified form having projections to resist lateral movement between the tread and the casing.

In this invention the tire consists of a casing member 10 and a tread member 11. The tread member is wholly independent of the casing and is removable from the casing at the will of the owner.

The casing 10 is provided with the usual beaded edges 12 and 13 for engagement with a rim. The main wall 14 of the casing 10 is of relatively uniform thickness between the beads 12 and 13. This wall 14 is provided with the desired number of fabric layers 15 to give the necessary strength to the wall of the casing 10.

The tread 11 is composed of a rubber body 16 that has a suitable tread design 17 impressed therein. The body 16 has the inner periphery of the same arcuate shape as the circular outer periphery of the casing 10. Thus, when the tread 11 is placed upon the casing 10 the inner periphery of the tread engages the outer periphery of the casing so that the tread and casing supportedly engage one another throughout the entire extent of their surface engagement.

The tread 11 may have a suitable number of metal or cloth fabric layers 18 placed therein to give added strength to the tread and to resist expansion of the tread and resist rupture and puncture.

The tread 11 has the side edges 19 and 20 thereof tapered downwardly to substantially feathered edges 21 and 22 respectively. Thus the feathered edges of the tread conform substantially to the contour to the outer surface of the casing 10 and provide a neat appearance.

To install the tread 11 on the casing 10, the casing is deflated sufficiently to permit encirclement of the casing by the annulus formed by the tread 11. When the tread is properly centered on the casing, the casing is reinflated to expand it into engagement with the tread 11 and thereby hold the tread in position on the casing.

It will be understood, of course, that the casing may be either of the tubeless variety or a tube can be used within the casing. Also, puncture sealing material such as semi-cured rubber, can be placed within the casing on the inner periphery thereof to provide for puncture-proofness of the casing and for blowout resistance.

The tread 11 preferably has the feathered edges 21 and 22 terminating in a semi-hard rubber lip which will grip the sidewall of the casing 10 and resist radial expansion of the edges of the tread and thereby prevent undue lifting of the edges of the tread as a result of the action of centrifugal force during operation of the tire.

In Figure 4 there is illustrated the use of a wire 25 in the feathered edge 26 of the tread 11a to resist the action of centrifugal force on the edge of the tread and to prevent any radial expansion of the tread, thus effectively locking it on the casing 10a. The wire 25 is in the form of an annulus embedded in the feathered edge of the tread 11a.

Also, in Figures 4 and 5 the inner periphery of the tread at the feathered edge is provided with an annular projection 36 that is received in an annular recess 27 provided in the casing 10a. This projection resists any transverse or lateral movement of the tread relative to the casing, thus locking it to position on the casing.

In Figure 6 there is illustrated another modified form of the projection for locking the tread onto the casing against transverse movement. In Figure 6 the annular projections 28 and 29 are provided on the casing 10b and are received in corresponding annular recesses in the tread 11b.

In Figure 2 there is illustrated a tread design 30 consisting of transversely extending ribs 31 which form mud grippers or snow grippers for use under adverse weather conditions. In Figure 3 the tread is illustrated with a series of sharp metal projections 33 which provide a nonskid surface for use on icy roads.

From the foregoing description it is obvious that the tread 11 of the tire of Figure 1 can be removed from the casing 10 and the tread of either Figures 2 or 3 be replaced onto the casing 10. Thus an owner of an automobile is capable of changing the tread on the tires to meet varying road conditions.

While the device disclosed and described therein illustrates preferred forms of the invention, yet it will be understood that various modifications of the invention can be made without departing from the spirit of the invention, and that all modifications that follow within the scope of the appended claim are intended to be included herein.

Having thus fully described my invention, what I claim as new and desire to secure as new by Letters Patent is:

A tire comprising a casing having a substantially circular outer contour in a cross-sectional plane taken transverse to the plane of the tire and having beaded edges for engagement with a tire rim, said casing further having a wall structure of relatively uniform thickness extending between the beaded edges, a separate tread removably carried on said casing and having an inner peripheral contour like said outer contour of the casing and being in contact therewith when said tire is in expanded condition whereby to hold said tread on said casing, said tread having side edge portions each tapering from a relatively thick portion to a substantially feathered edge engaging said casing at points positioned substantially diametrically opposite each of the beaded edges of said casing, said thick portions adjacent said feathered edges each including an annularly extending substantially inextensible wire embedded therein to resist radial expansion of the said edge portions, annular projections integral with the inner surface of said tread at said thick portions and extending around the wall of the tread and between said inextensible wire and said casing, and annular recesses in the casing for receiving said annular projections whereby said tread is interlocked with said casing.

References Cited in the file of this patent

UNITED STATES PATENTS

| Number | Name | Date |
|---|---|---|
| 705,177 | Wheeler | July 22, 1902 |
| 969,722 | Pitman | Sept. 6, 1910 |
| 1,053,953 | Ascheri | Feb. 18, 1913 |
| 1,110,451 | McGiehan | Sept. 15, 1914 |
| 1,425,356 | Allden | Aug. 8, 1922 |
| 1,441,458 | Shotwell | Jan. 9, 1923 |
| 1,478,156 | Whitcomb | Dec. 18, 1923 |
| 1,494,621 | Ogilvie | May 20, 1924 |
| 1,597,775 | Erb | Aug. 31, 1926 |
| 2,167,277 | Kaiser | July 25, 1939 |